Nov. 10, 1942. R. MELVILLE 2,301,308
FLUID DISPLACEMENT MECHANISM
Filed April 15, 1939 11 Sheets-Sheet 2

INVENTOR
ROBERT MELVILLE
BY
ATTORNEYS

Nov. 10, 1942.  R. MELVILLE  2,301,308
FLUID DISPLACEMENT MECHANISM
Filed April 15, 1939  11 Sheets-Sheet 6

INVENTOR
ROBERT MELVILLE
BY
Anderson & Liddy
ATTORNEYS

Nov. 10, 1942.　　　R. MELVILLE　　　2,301,308
FLUID DISPLACEMENT MECHANISM
Filed April 15, 1939　　　11 Sheets-Sheet 7

INVENTOR
ROBERT MELVILLE
BY
Meem, Anderson & Liddy
ATTORNEYS

Nov. 10, 1942.  R. MELVILLE  2,301,308
FLUID DISPLACEMENT MECHANISM
Filed April 15, 1939  11 Sheets-Sheet 9

INVENTOR
ROBERT MELVILLE
BY
*Munn, Anderson & Liddy*
ATTORNEYS Nov. 10, 1942.  R. MELVILLE  2,301,308
FLUID DISPLACEMENT MECHANISM
Filed April 15, 1939  11 Sheets-Sheet 10

INVENTOR
ROBERT MELVILLE
BY
Munn, Anderson & Liddy
ATTORNEYS

Patented Nov. 10, 1942

2,301,308

UNITED STATES PATENT OFFICE 2,301,308

FLUID DISPLACEMENT MECHANISM

Robert Melville, Challis, Idaho

Application April 15, 1939, Serial No. 268,057

23 Claims. (Cl. 192—61)

This invention relates generally to fluid displacement mechanisms for variable speed transmissions, brakes and other units for motor vehicles and various forms of machinery.

An object of the invention is to provide a fluid displacement mechanism wherein variable speed ratios between driving and driven elements and variable braking forces on a driven element can be obtained by the displacement of liquid caused by correlated gears, the teeth of at least certain of which are free to operate in slots in the gear and capable of being adjusted from a non-meshing position to various meshing positions up to a full mesh relative to the teeth of another gear in order to obtain the variable liquid displacement, to the end of obviating the necessity of providing shiftable gears for this purpose.

Another object of the invention is the provision of a gear structure wherein liquid can by-pass therethrough in a manner to relieve pressure on the teeth during adjustment thereof as well as to form an additional means for controlling the displacement of liquid in order to vary the power and speed ratios.

A further object of the invention is the provision of valve controlled liquid by-passes around the zone of meshing of correlated gears in order to facilitate adjustment of the teeth, and to provide means for constantly relieving pressure from the chambers, by allowing an unrestricted passage of liquid from the chambers to the suction side of the meshing gears.

Another object provided in the transmission is a large valve in a fluid by-pass connecting the fluid space on each side of the meshing point of the gears, operated relative to the meshing of the gears, facilitating this gear operation and providing a very effective control of fluid displacement.

Another object is the provision of means for a gradual, smooth-acting, frictional engagement of a free-running sun gear to the driven shaft, for starting the gear into motion equal to that of the shaft in co-operation with a locking device rigidly locking it to the shaft.

A further object is the provision of a co-operating telescoping lever device to provide means for co-ordinated operation of the mechanisms, and which is readily adaptable to the operation of other devices.

Another object is the provision of means in the form of an expanding or elastic diaphragm in the wall of the brake housing, to compensate for the increase and decrease in the volume of the housing caused by passage of a sleeve around the driven shaft, into and out of the housing when operating the mechanism.

With these and other objects in view, the invention consists in the combinations and arrangements of elements as set forth in the following specification and particularly pointed out in the appended claims.

In the accompanying drawings.

Referring specifically to the drawings, the invention in its present embodiment comprises a variable speed fluid transmission unit U, a combined fluid brake and clutch unit U', and an operating mechanism O common to both units and associated therewith in a manner to effect a predetermined sequence of operation of the units under the control of an operator.

Reference will be had particularly to Figures 1 to 15, inclusive, which illustrate the transmission unit U. This unit comprises co-axially arranged driving and driven shafts 10 and 11, respectively, the former of which can be operatively connected to a power plant (not shown) such as the motor of an automobile or other vehicle.

To the drive shaft 10 is fixed by means of a key 12, one section 13 of a housing H, a second section 14 of which is secured to the section 13 by bolts 15 (Figure 2) for co-action of the sections in providing a chamber 16 therein in which is snugly and rotatably mounted a sun gear 17 fixed to the driven shaft 11 by a key 18. The gear 17 is cup-shaped in cross section, and its annular wall is provided with internal teeth 19 with which the teeth 20 of identical planetary gears 21 are adapted to be meshed and unmeshed.

Figure 3:
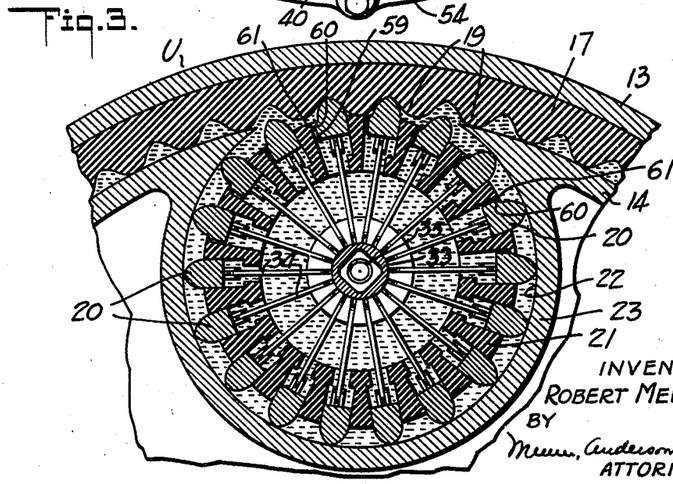
Figure 3 is a transverse sectional view taken on the line 3—3 of Figure 1.
Figure 5:
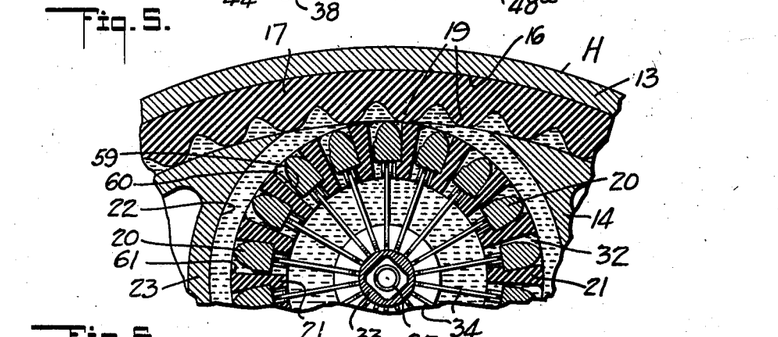
Figure 5 is a transverse sectional view taken on the line 5—5 of Figure 4.
Figure 6:
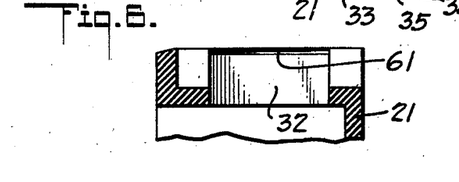
Figure 6 is a fragmentary detail sectional view of a planetary gear embodied in the unit.

The planetary gears 21 of which two are illustrated at diametrically opposed points, are snugly received and rotatably mounted in auxiliary chambers 22 peripherally communicating with the annular portion of the chamber 16 as clearly shown in Figures 3 and 5. The auxiliary chambers 22 are formed in part by annular portions 23 of the section 14, and their open sides are closed by cup-shaped covers 24 secured in place by screws 25 and having cover plates 26 removably secured to the covers 24 by screws 27.

The gears 21 are cup-shaped in cross section and are provided at their open ends with annular flanges 28 journaled in complementary recesses 29 in the covers 24. At their closed ends the gears 21 are provided axially with hollow axles 30, the outer ends of which are journaled in bearings 31 in the housing section 14.

The gears 21 are thus mounted in the housing H to rotate about their own axes and to revolve about the axis of the drive shaft 10 during rotation of the housing thereby. In order to provide for variably meshing and unmeshing the gears 21 with respect to the sun gear 17 so as to vary the displacement of liquid which fills all otherwise unoccupied space in the chambers 16 and 22, and hence to vary the speed ratio between the driving and driven shafts, the teeth 20 of the planetary gears 21 are rendered radially movable from a position in full mesh with the teeth 19 as shown in Figures 1 and 3 to a position entirely out of mesh with the teeth 19 as shown in Figures 4 and 5.

Figure 1:
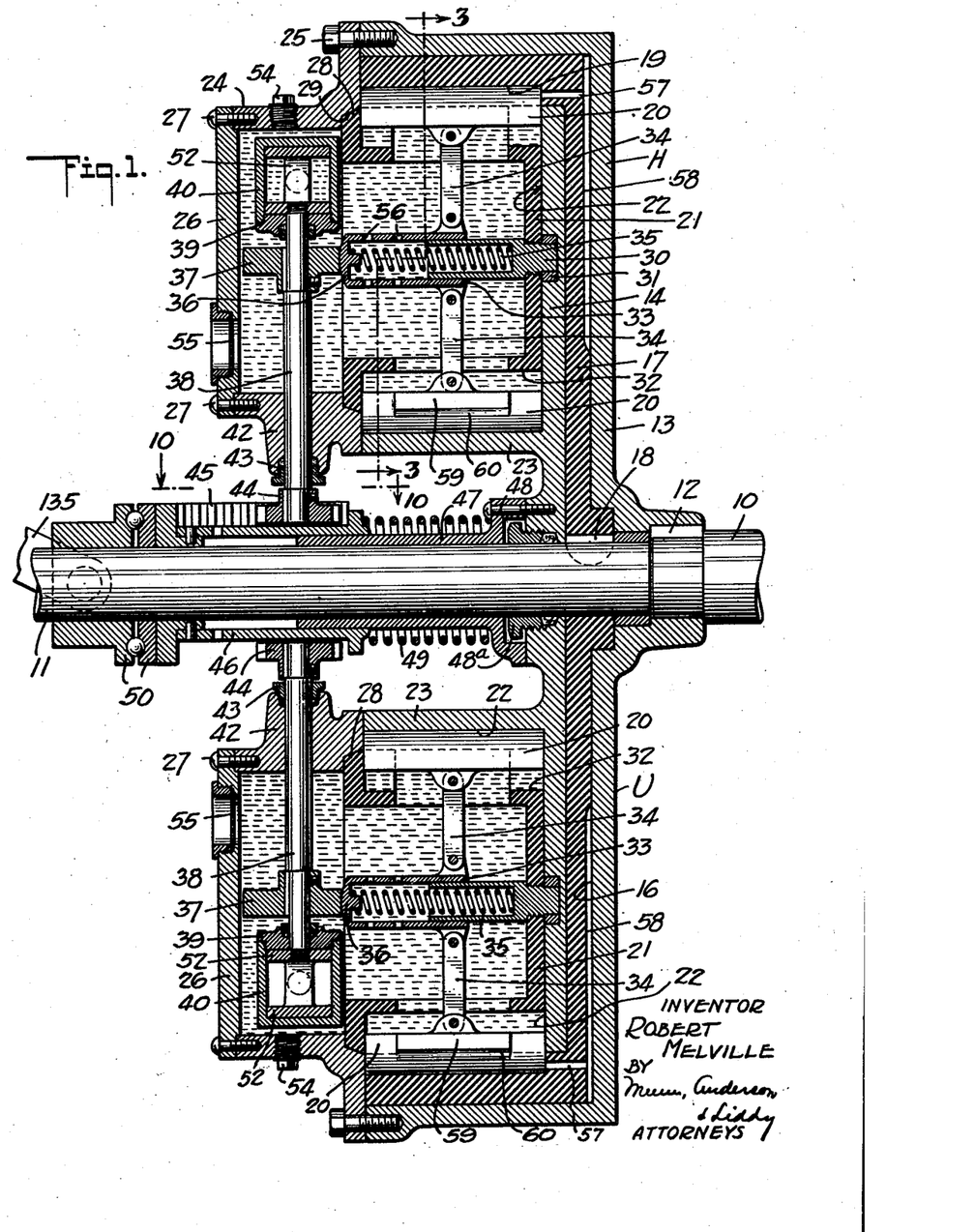
Figure 1 is a view showing in central longitudinal section the variable speed fluid transmission unit embodying this invention.
Figure 2:
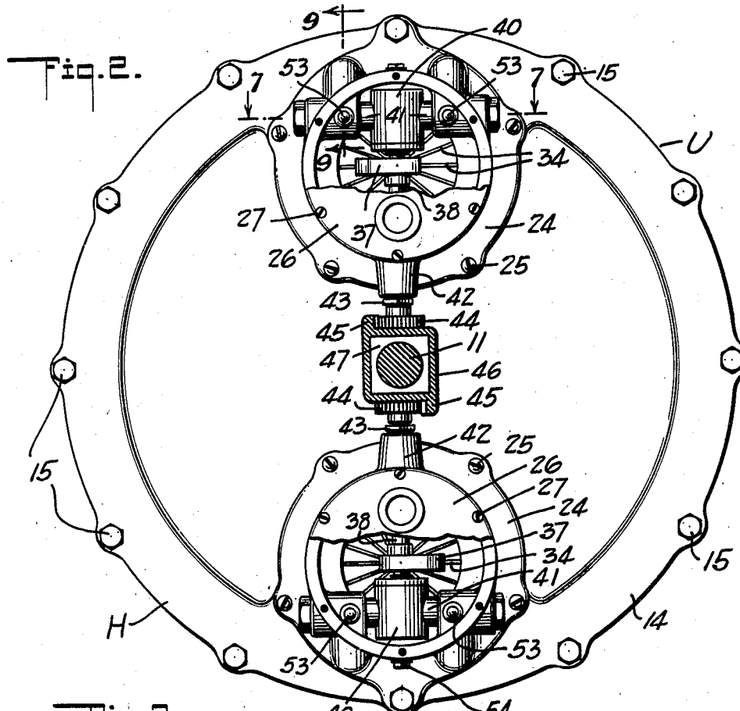
Figure 2 is a view of the transmission unit in rear elevation with parts broken away and other parts in section for the sake of clearness.
Figure 4:
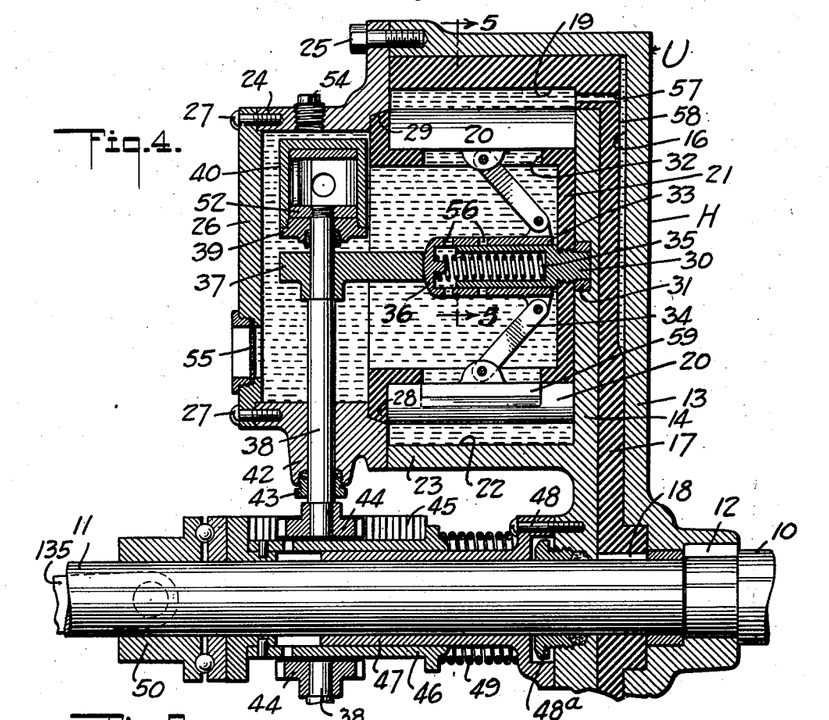
Figure 4 is a fragmentary view similar to Figure 1, but illustrating a different position of the unit.

For this purpose, the teeth 20 are slidably mounted in slots 32 in the annular wall of the gear and are co-extensive in length therewith, as shown in Figures 1 and 4. To actuate the teeth of the planetary gears simultaneously and correspondingly, a sleeve 33 is slidably mounted on each axle 30 and is operatively connected pivotally by means of toggle links 34 to the respective teeth, as clearly shown in Figures 1, 3, 4 and 5, so that under the urging action of a coil spring 35 disposed in the axle and sleeve to abut the closed outer end 36 of the latter and the bottom of the hollow portion of the axle, the teeth 20 will be normally urged to the advanced or meshed position relative to the teeth 19, as shown in Figures 1 and 3.

Figure 7:
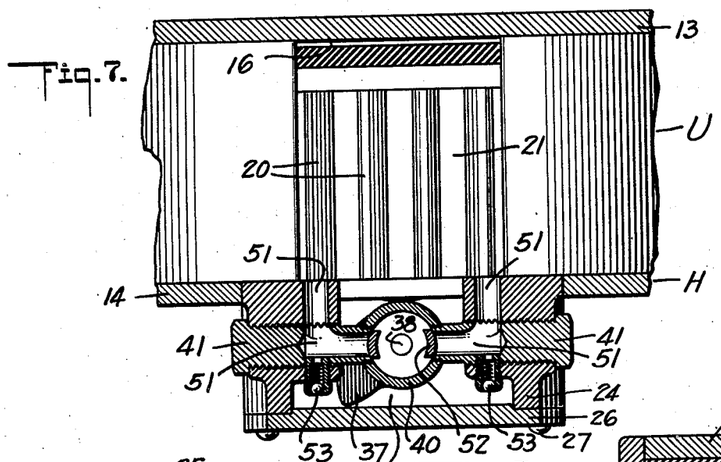
Figure 7 is a sectional view taken on the line 7—7 of Figure 2.

To move the teeth of each planetary gear from such fully meshed position to any lesser degree of mesh to a fully unmeshed relationship with the teeth 19 as shown in Figures 4 and 5, a cam 37 fixed to a radially arranged shaft 38 journaled at its outer end in the head 39 of a cylindrical valve body 40 supported in the chamber 22 by diametrically disposed studs 41—41 threaded into the cover 24 as clearly shown in Figure 7. At its inner end, each shaft 38 is journaled in a bearing 42 on the cover 24, and passes through a stuffing box 43 beyond which the shaft has fixed thereto a gear 44 constantly meshing with the teeth of a rack bar 45 formed on a sleeve 46. The bore of the sleeve 46 is square in cross section to slidably receive and provide a keyed connection with a second sleeve 47 fixed by screws 48 to the section 14 of the housing and enclosing a stuffing box 43a for preventing leakage of liquid from the chamber 16 around the driven shaft 11 all as clearly shown in Figure 1.

A coil spring 49 surrounds the sleeve 47 to normally urge the sleeve 46 to the extreme position shown in Figure 1 wherein the teeth 20 of the planetary gears 21 are fully meshed with the teeth 19 of the sun gear 17. A thrust bearing 50 surrounds the driven shaft 11 for co-action with the sleeve 46 in moving the latter to the extreme position shown in Figure 4 wherein each cam 37 has been rotated to effect adjustment of the teeth 20 to the fully unmeshed position thereof shown in Figure 4, all in response to actuation of the operating mechanism O in a manner to be later more fully described.

Drilled in the studs 41 and in the covers 24 are by-pass passages 51—51 placing the interior of each valve body 40 in communication with the annular portion of the chamber 16 directly at opposite sides of the zones of mesh of the gears 21 with the gear 17 under the control of a rotary valve 52 fixed to the shaft 38 and working in the body 40 to close or open the passages 51 according as the teeth 20 are fully meshed or partly meshed and unmeshed with respect to the teeth 19 of the gear 17, all as shown clearly by the relative positions of the cam 37 and valve 52 in Figures 11, 12, 13 and 14. Check valves 53—53 are associated with the respective passages 51—51 to open inwardly thereof, and liquid is adapted to be supplied to the housing H to fill all unoccupied space therein, through filling openings in the covers 24, closed by removable plugs 54. In order to compensate for changes in volume of the contained liquid under the influence of temperature changes, openings in the cover plates 26 are closed by flexible metallic or elastic diaphragms 55 exposed at their inner sides to the liquid.

So that the movement of the sleeves 33 will be unrestricted by the liquid, their annular walls are provided with openings 56; and in order to provide for lubrication, as well as to balance the pressure on opposite sides of sun gear and prevent adhesion thereof to the housing walls, openings 57 are provided in the sun gear 17, the openings communicating with the outer radial face of the sun gear which is slightly spaced from the confronting wall of the housing section 13, as shown at 58 in Figure 1, in order to provide a shallow space for the reception of the liquid. The openings 57 in the gear 17 are so spaced as not to register at the same time, with the opposite sides of the meshing point of the gears, in order to prevent an undesired by-pass of fluid.

It will be noted from a consideration of Figures 1 and 3 that for approximately three-fourths of their lengths the teeth 20 are widened on one side as shown at 59 and are provided with a beveled shoulder 60 which in the fully meshed positions of the teeth seats liquid-tight against the complementarily beveled portion 61 of the respective slot 32. The remaining portion of such wall of each slot 32 inwardly of the beveled portion 61 is spaced from the respective tooth 20 so that liquid can readily by-pass through the slots, except when the teeth are fully advanced, to thus not restrict movement of the teeth. It will be understood that the remaining portions of the side walls of the teeth 20 have sliding engagement with the walls of the slots 32 so that the teeth will be positively guided radially in their movements.

In the operation of the transmission unit U, which in certain environments can be employed as a fluid brake, let it be assumed that the necessary liquid, such as oil, glycerine or other suitable fluid, has been supplied to the housing H, and that the teeth 20 are fully meshed with the teeth 19 as shown in Figure 1. The by-pass valve 52 is closed in this position, as shown in this figure, and in the corresponding position shown in Figure 11. Furthermore, the teeth 20 are locked in their advanced positions by the links 34 which function in the manner of a toggle joint, as will be readily apparent from a consideration of Figures 1 and 4.

With the teeth 20 and 19 fully meshed, and the by-pass valve 52 closed, there can be no displacement of liquid in the housing H. Thus, when power is applied to the drive shaft 10 the planetary gears 21 and the sun gear 17 will act as a unit to rotate the driven shaft 11 at the same speed and in the same direction as the drive shaft.

Figures 8, 9, 10, 11, 12, 13, 14, 15:
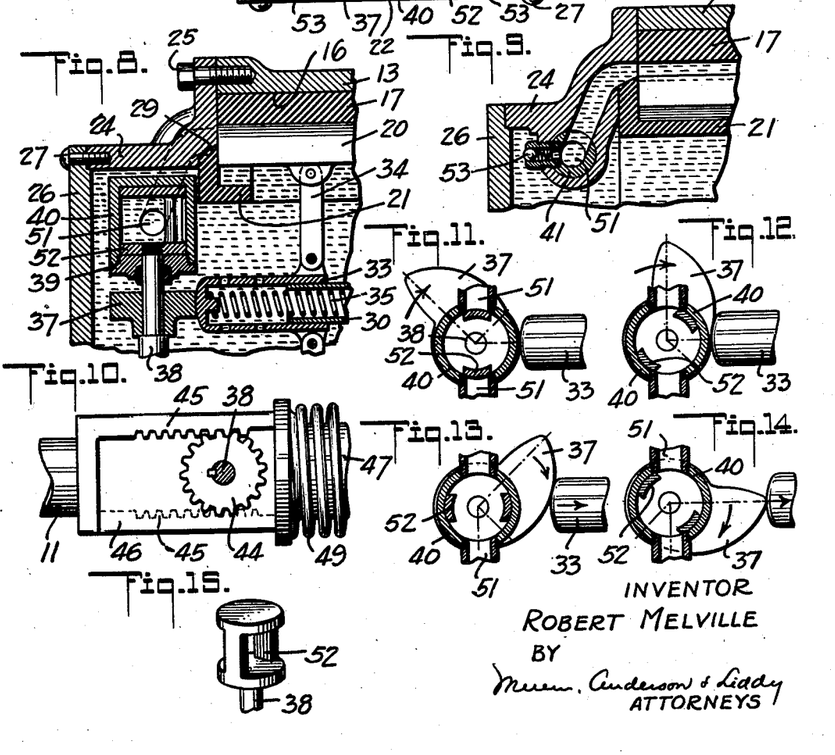
Figure 8 is a fragmentary view of a portion of the unit shown in Figures 1 and 4 but illustrating a different position of a by-pass valve embodied in the invention.
Figure 9 is a transverse sectional view taken on the line 9—9 of Figure 2.
Figure 10 is a longitudinal sectional view taken on the line 10—10 of Figure 1.
Figures 11, 12, 13 and 14 are semi-diagrammatic sectional views illustrating different positions occupied by the by-pass valve and a cam means for actuating teeth of a planetary gear embodied in the invention.
Figure 15 is a perspective view of the by-pass valve.

However, previous to the retraction of the teeth 20 from their fully meshed position, the by-pass valve 52 immediately opens, as will be evident from the relative positions of the valve and the cam 37 in Figure 12, the valve remaining fully open, as illustrated in Figures 13 and 14, except in the fully meshed position of the teeth. During the unmeshing and meshing operations, it will be evident that more or less fluid can accordingly be displaced between the teeth of the planetary and sun gears, thus varying the rotational speeds of the planetary gears about their own axes, and hence varying the speed ratio between the driven shaft and the drive shaft 10, until in the fully unmeshed position shown in Figures 4 and 5, the operative connection between the shafts will be disrupted so that no power will be transferred to the driven shaft.

The provision of the by-passes 51—51 and the manner of controlling them by the valves 52 in timed relationship to the meshing and unmeshing of the gears, permit easy and rapid movement of the teeth by relieving most of the liquid pressure on the teeth during the meshing and unmeshing operation, this structure providing an additional means for gradual fluid control to different positions of adjustment of the unit. The co-acting shoulders 60 and beveled portions 61 of the teeth 20 and gears 21, respectively, prevent displacement of liquid through the slots in the fully meshed position of the teeth; and the clearances between one side of the teeth and slots inwardly of the shoulders 60 permit by-passing of liquid through the slots so as not to retard meshing and unmeshing movements of the teeth.

Furthermore, the check valves 53 provide for the relief of pressure in the auxiliary chambers 22 caused by leakage from the pressure side of the meshing gears, and also allow the passage of liquid from the auxiliary chambers as is necessary before the by-pass passages 32 open when initiating retraction of the teeth 20 from the fully meshed position.

It will be appreciated that the cross sectional contours of the teeth 19 and 20, as clearly shown in Figure 3, enable the teeth to be readily meshed and unmeshed by radial movement of the teeth 20 so that the liquid will be variably displaced in accordance with the extent to which the teeth are meshed, thus in co-operation with the valve 52 varying the driving engagement and planetary motion of the gears 21.

Figure 16:
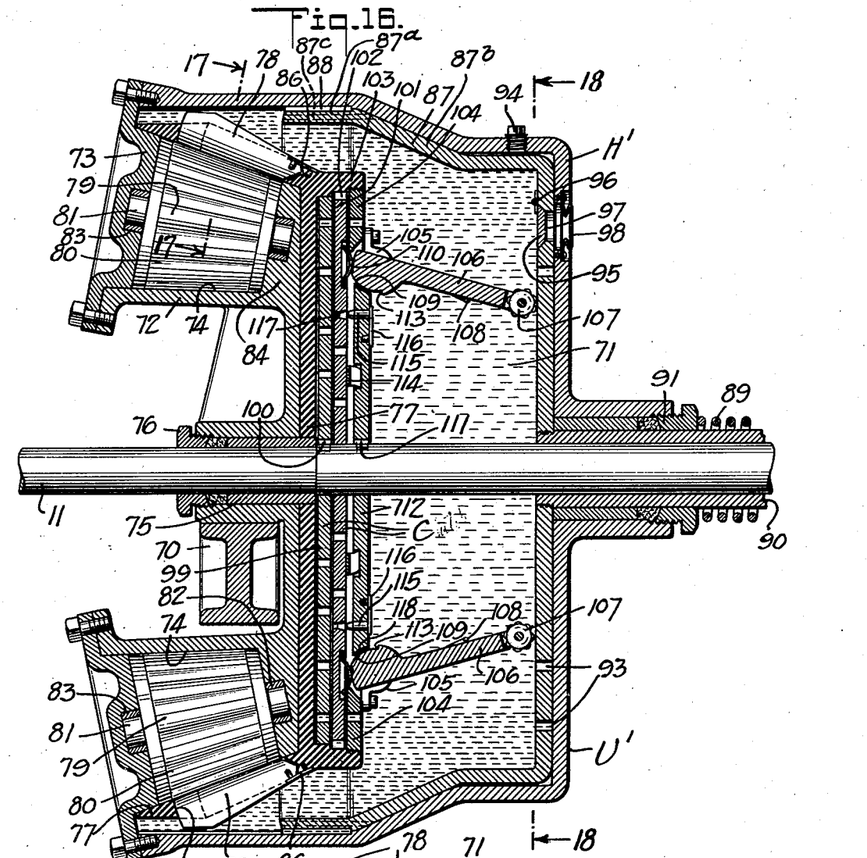
Figure 16 is a central longitudinal sectional view of a combined brake and clutch unit embodied in the invention.

Reference will now be had to Figures 16 to 22, inclusive, illustrating the fluid brake unit U' embodying this invention and operatively associated with the fluid transmission unit U, the driven shaft 11 being extended from the thrust bearing 50 and being journaled in a two-part stationary housing H' which, in the installation of the invention in an automobile, can be fixedly supported by a transverse member 70 forming part of the chassis frame (not shown). The housing H' is generally cylindrical internally to provide a liquid chamber 71, and is formed at diametrically opposed locations with lateral projections 72 closed at their front ends by removable cover plates 73 and providing auxiliary chambers 74 in communication with the chamber 71, as shown in Figure 16.

The driven shaft 11 is journaled in the housing H' by means of a bearing 75 with which a stuffing box 76 co-acts to seal one end of the housing against leakage of liquid therefrom around the shaft. Fixed to the bearing 75 so as to be rotatably mounted therewith on the shaft 11 is an internal sun gear 77 of the beveled type having radially movable teeth 78 adapted to be brought into meshing engagement with the teeth 79 of bevel gears 80 rotatably mounted in the auxiliary chambers 74 by means of axles 81 supported by bearings 82 and 83 in one part 84 of the housing and in the removable cover plates 73, as clearly shown in Figure 19.

Figure 17:
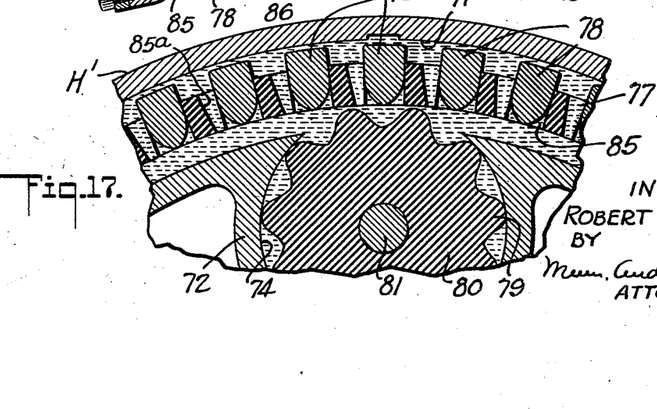
Figure 17 is an enlarged fragmentary sectional view taken on the line 17—17 of Figure 16.
Figure 18:
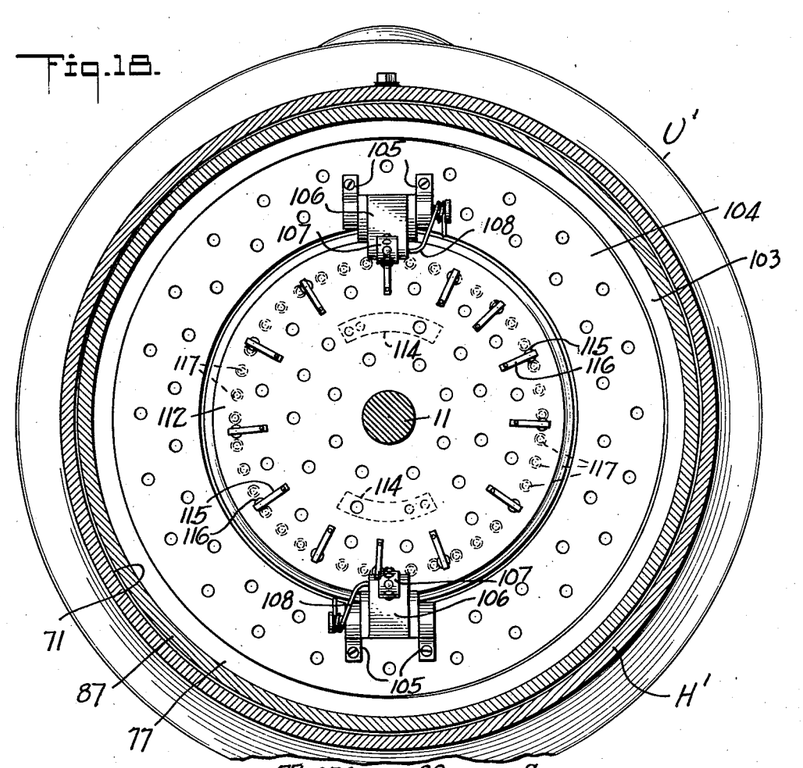
Figure 18 is a transverse sectional view taken on the line 18—18 of Figure 16.

The movable teeth 78 are mounted in slots 85 in the annular portion of the sun gear 77 by means of flat springs 86 at one end of the teeth and are normally urged by the springs to the non-meshing positions shown in Figures 16 and 17.

Figure 19:
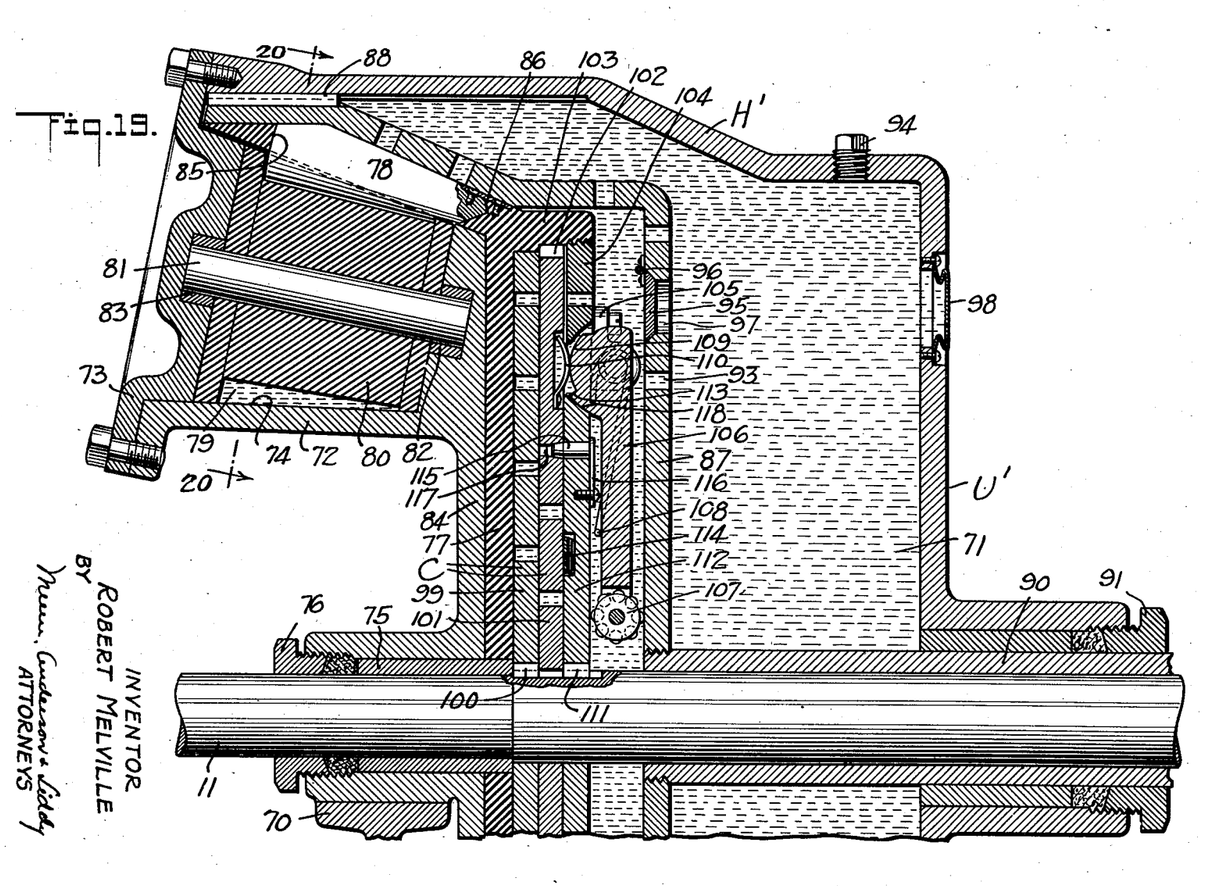
Figure 19 is an enlarged fragmentary sectional view similar to Figure 16, but illustrating a different position of the unit.
Figure 20:
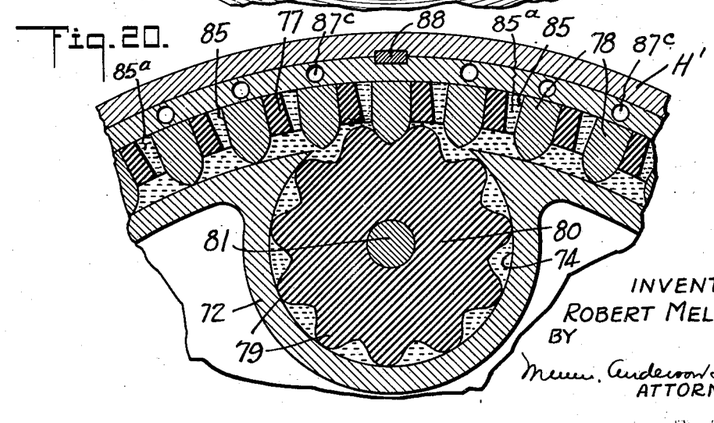
Figure 20 is a transverse sectional view taken on the line 20—20 of Figure 19.

In gear 77 adjoining the slots 85 in which the teeth operate and at a point opposite the greatest fluid displacement caused by the greatest meshing depth of the gear, passages 85a are located between the teeth for by-pass of fluid past the meshing point of the gears, to facilitate the operation of the teeth, and give a very effective and easily operated means for control of the fluid displacement after the teeth are in full mesh, The teeth 78 are adapted to be moved from the non-meshing position shown in Figure 19 by means of the cylindrical portion 87a of an actuating member 87 in the form of a hollow cylindrical and cone-shaped frustum slidably keyed to the housing H' by keys 88, and disposed in the chamber 71 so as to be normally urged to the inactive extreme position shown in Figure 16 by means of a coil spring 89 surrounding a sleeve 90 mounted freely on the shaft 11. The member 87 is fixed to the inner end of the sleeve 90 and the spring 89 abuts the gland nut of a stuffing box 91, and a collar 92 containing a stuffing box 92a around the shaft 11, the collar being fixed to the outer end of the sleeve as shown in Figures 23 to 27, inclusive. In the cylindrical portion 87a are by-pass ducts 87c which allow fluid to pass from one side to the other of member 87 during actuation thereof.

The actuating member 87 is provided with openings 93 therethrough for the passage of liquid from one side of the member to the other in order to enable the member to be advanced and retracted through the liquid which is adapted to be supplied to the housing to fill all otherwise unoccupied space therein, through a filling opening closed by a removable plug 94. A flap valve 95 mounted at 96 on the member 87 controls a port 97 in the latter, and functions to open the port upon retracting movement of the member in order to facilitate such movement and permit rapid release of the brake. The member 87 includes a conical portion 87b, which presses firmly against the gear 77 at the conclusion of the actuating thrust of the member 87 and forms the locking means between the stationary housing and the gear, which is then locked to the driven shaft 11, in order to prevent any further motion of the brake after it is fully applied that might result from a slight fluid leakage past the meshing point of the gears, due to any continued pressure on the shaft 11. Also comprised in the actuating member 87 at its outer edges is a cylindrical portion 87a, the outer edge of which acts to close simultaneously the movable teeth of the gear 77, after which its continued thrust holds the teeth closed, and forms the slidable means of closing the slots 85a, which operate as fluid by-passes between all the teeth, giving a very effective and easily operated means of control of fluid displacement. This by-pass construction and method of operation can be greatly varied in other gears and in other devices. An expansible diaphragm 98 covering an opening in the housing H' compensates for volumetric changes in the liquid resulting from variations in temperature and the volume of the actuating sleeve.

Correlated with the sun gear 77 and the actuating member 87 is a clutch C comprising a driving disk 99 slidably keyed at 100 to the shaft 11, and a driven disk 101 slidably keyed at 102 within the annular flange 103 of the gear 77, the disks being confined within the flange by a retaining ring 104 on which is supported brackets 105 in pairs at diametrically opposed points. Pivotally mounted in these brackets are levers 106, the free ends of which carry ball bearing studded rollers 107 engaging the radial portion of the actuating member 87 under the action of springs 108 which urge the levers to the extreme position shown in Figure 16.

Figure 21:
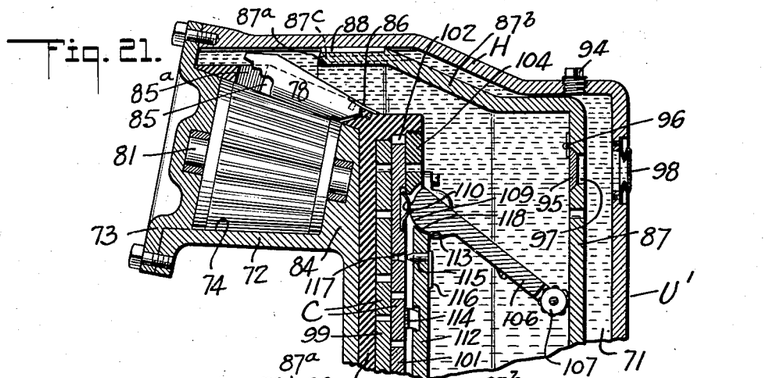
Figures 21 and 22 are fragmentary sectional views similar to Figure 16 but illustrating different positions of the unit.

At their hubs the levers 106 are formed to provide cams 109 engaging wear compensating springs 110 on the driven disk 101 and co-acting therewith to frictionally engage the disks 99 and 101 during advancing movement of the actuating member 87 from the fully retracted position shown in Figure 16 to the position shown in Figure 21 so that the sun gear 77 will be operatively connected to the driven shaft 11.

Figure 22:
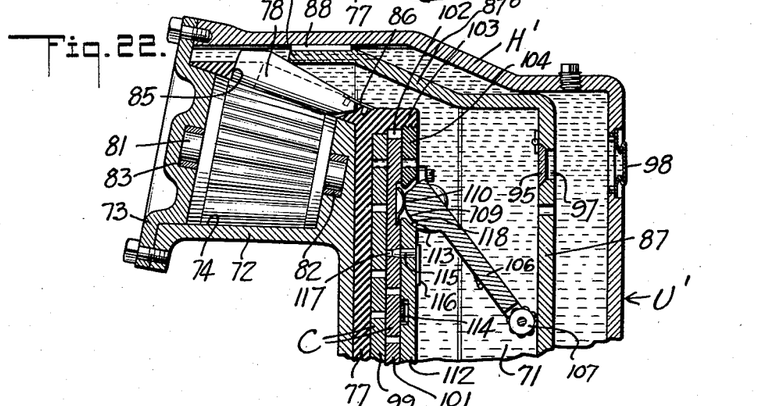
Figure 23:
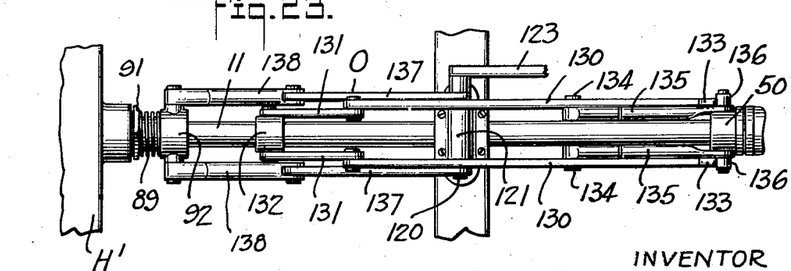
Figure 23 is a plan view of an operating mechanism common to the aforestated units.

Slidably keyed at 111 to the shaft 11 is a locking plate 112 with which shoulders 113 on the hubs of the levers 106 co-act during movement of the levers from the position shown in Figure 21 to that shown in Figure 22 to shift the plate against the normal urging action of springs 114 from a released position to a locking position for the purpose of positively locking the sun gear to the driven shaft prior to meshing of the teeth 78 with the teeth 79 of the gears 80.

The locking plate 112 is provided with a circular series of locking pins 115 slidably mounted in openings in the plate and carried by springs 116 which yieldingly urge the pins to a projected position for the reception of one or more of the pins in holes 117 provided in a circular series in the driven disk 101. It will be noted that the forward ends of the pins 115 are beveled, and that the holes 117 are flared so as to facilitate the entrance of the pins. Furthermore, the circumferential spacing and number of the holes relative to the pins is such as to insure that irrespective of the position of the locking plate rotatively to the driven disk, one or more of the pins will be perfectly or sufficiently alined with holes in such disk to insure locking of the plate to the disk. The springs 116 of all other pins will, of course, yield to permit such other pins to retract as the plate is advanced to its locking position shown in Figure 22. It will be noted from this position that the shoulder 113 has ridden over the arcuate edge 118 of the locking plate so as to retain the latter in locking position during movement of the levers 106 to their other extreme positions shown in Figure 19 wherein the actuating member is fully advanced, first bringing the teeth 78 in fully meshed relationship with the teeth 79, and then closing the by-passes 85a, after which the conical portion 87b bears solidly against the sun gear 77, locking it to the housing to prevent any further motion due to leakage of fluid between the teeth. It will also be noted that the disks 99 and 101 (Figure 16) and the locking plate 112 (Figure 18) are provided with a multiplicity of openings therethrough for the passage of liquid in order that the liquid will not restrict movement of these parts.

The operation of the brake unit U' is as follows:

Let it be assumed that all otherwise unoccupied space in the chamber 71 and the chambers 74 be filled with liquid such as glycerine, oil or other non-compressible fluid, and that the working parts of the unit occupy the respective positions as shown in Figure 16, wherein the clutch C is disengaged, and the teeth 78 of the sun gear 77 are unmeshed from the teeth 79 of the gears 80.

As the liquid in the housing H' is free to be displaced, the shaft 11 will rotate freely in the housing, carrying with it the driving disk 99 and locking plate 112 so that the brake will thus be fully released.

When it is desired to apply the brake, movement of the member 87 from its retracted position shown in Figure 16 is effected to first cause such movement of the levers 106 that their cams 109 engage the disks 99 and 101 of the clutch C, as shown in Figure 21, so as to rotate the sun gear 77 with the driven shaft 11. Continued movement of the member 87 will cause the shoulders 113 to co-act with the locking plate 112 in advancing one or more of the pins 115 in locking engagement with the driven disk 101, thus positively locking the sun gear 77 to the driven shaft as shown in Figure 22.

Further advancing movement of the member 87 will cause the leading annular edge of the cylindrical portion 87a of the member to engage and move the teeth 78 of the sun gear into meshing relationship with the teeth 79 of the gears 80, thus initiating displacement of liquid and thereby setting up a braking action upon the shaft 11 which increases in power as meshing of the teeth is increased, until they are fully meshed, after which the cylindrical portion 87a slides across and closes the by-passes 85a, which gives the greatest control of the fluid displacement, as shown in Figure 19, whereupon there can be no more displacement of liquid between the teeth so that maximum braking of the shaft 11 will be effected. The braking effort can thus be graduated in accordance with the position to which the member 87 is advanced or is permitted to retract under the action of the spring 89.

Reference will now be had to Figures 23 to 27, illustrating the operating mechanism O which is common to the two units U and U' and comprises a rock shaft 120 journaled transversely with respect to the driven shaft 11 and intermediate the units, in a bearing 121 supported on a transverse member 122 forming part of the chassis frame (not shown) of an automobile.

Fixed to one end of the shaft 120 is a lever 123 to the free end of which is pivoted a pedal arm 124 working freely through a slot 125 in the floorboard 126 of the driver's compartment of the automobile. One longitudinal edge of the arm 124 is provided with a series of notches 127 any one of which is adapted to receive a keeper 128 carried by the floorboard. A spring pressed ball 129 is mounted in the floorboard and rides on the opposite longitudinal edge of the arm 124 to urge the latter towards the keeper 128 so that the latter will normally coact with one of the notches 127 in releasably retaining the pedal arm in any depressed position of adjustment, yet will readily permit release of the arm by the foot of the operator, and constitutes the means for holding the different mechanisms in selected positions of adjustment.

Figure 24:
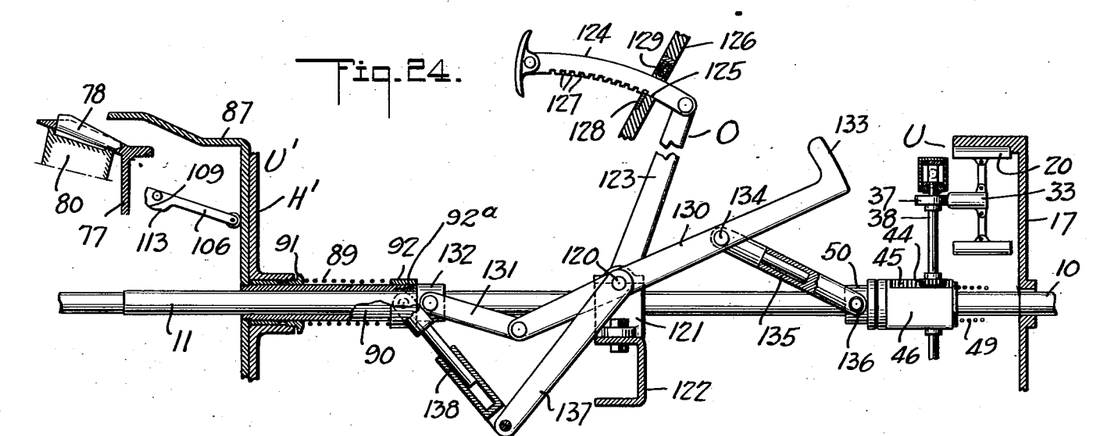
Figures 24, 25, 26 and 27 are semi-diagrammatic views illustrating the operating mechanism in respectively different positions of adjustment.

Fixed intermediate their ends to the shaft 120 at opposite ends of the bearing 121 are identical levers 130—130, the rear ends of which are operatively connected by links 131—131 to a collar 132 freely mounted on the driven shaft 11 and adapted to abut the collar 92 on the outer end of the sleeve 90 when the pedal arm 124 occupies its normal elevated position shown in Figure 24.

Intermediate the rockshaft 120 and the forward extremities of the levers 130, which extremities are provided with lateral arcuate extensions 133, are pivotally connected at 134 two-part links 135—135 composed of telescopically associated sections providing a lost motion operative connection between the levers 130 and the thrust bearing 50 of the transmission unit U. At the pivotal connections of the links 135 with the thrust bearing 50 rollers 136—136 are rotatably mounted for rolling engagement with the arcuate extensions 133 of the levers 130 to maintain the thrust bearing 50 in a fully advanced position when the mechanism occupies the position shown in Figure 27.

Also fixed to the rock shaft 120, and at the outer sides of the levers 130 are levers 137—137 to the free ends of which are pivotally connected two-part links 138—138 composed of telescopically associated sections providing a lost motion operative connection between the levers 137 and the collar 92 for a delayed operation of the actuating member 87 in the manner to be described in the operation of the mechanism O in conjunction with the units U and U', which is as follows and approximately illustrated, but which may be greatly varied in timing of the levers, and overlapping simultaneous action of the operated mechanisms, which in this invention being a co-operating fluid transmission and fluid brake, the action of which will overlap because of the fact that when the transmission is partly released it ceases to apply torque of any consequence to the driven shaft 11, and correspondingly in the application of the brake, no torque of any consequence is applied to the shaft 11 until the latter part of the operation.

With the operating mechanism O occupying the normal position shown in Figure 24 wherein the pedal arm 124 is fully elevated, the brake provided by the unit U' will be fully released and the transmission unit U will provide a direct connection so that with power applied to the drive shaft 10, the driven shaft 11 will be rotated thereby at the same speed. It is to be understood that a separate clutch can be provided between the transmission unit U and the engine, but in practice the effect of such a clutch can be obtained by latching the pedal arm 124 in its fully depressed position shown in Figure 27, wherein the transmission unit U is entirely inactive to drive the driven shaft 11 and the brake is fully applied.

Figure 27:
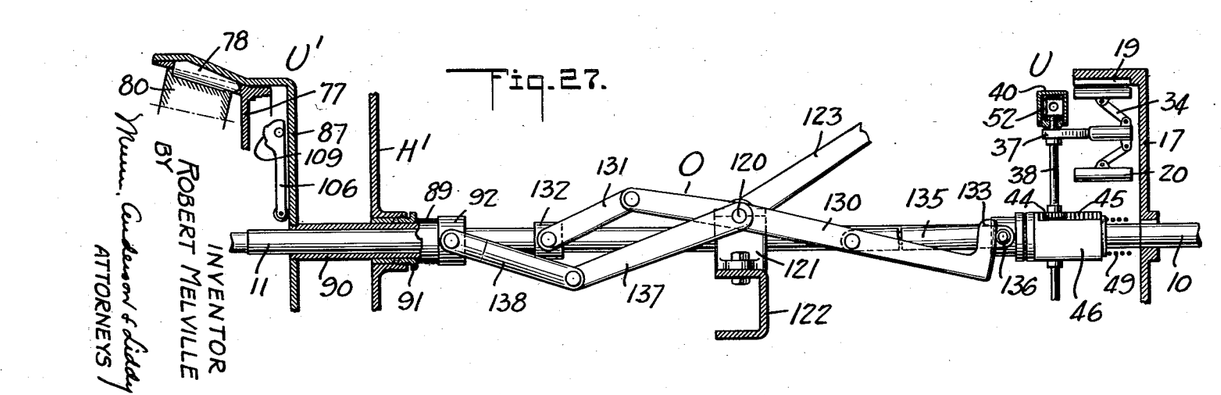

With the parts of the invention occupying the positions shown in Figure 27, the first portion of raising movement of the pedal arm 124 under the action of the spring 89, and following unlatching of the pedal arm from the keeper 128, will open the by-passes 85a by retracting the cylindrical portion 87a, which also permits the teeth 78 of the sun gear 77 to unmesh from the teeth 79 of the gears 80, thus releasing the brake on the driven shaft 11. During the first portion of this movement, which corresponds to the change in position of the mechanism from Figure 27 to Figure 26, the arcuate extensions 133 of the levers 130 coact with the rollers 136 to maintain the transmission unit U inactive until the brake has been released and the clutch C disengaged. Following the release of the brake, continued raising movement of the pedal arm 124 will render the spring 49 and the springs 35 free to act in moving the teeth 20 of the planetary gears 21 from their unmeshed relationship to the teeth 19 of the sun gear 17 into mesh therewith, thereby starting to restrict displacement of liquid in the transmission housing H and establish a low gear condition between the drive shaft 10 and the driven shaft 11 due to the resulting planeting motion of the gears 21 as they rotate about their own axes.

Figure 25:
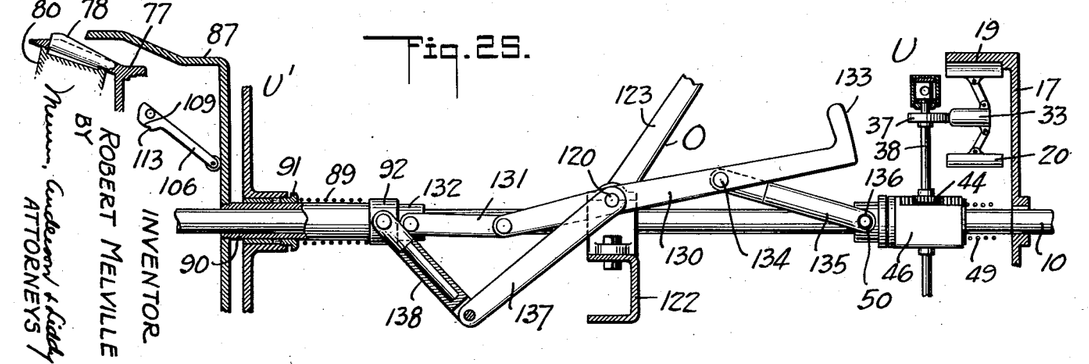
Figure 26:
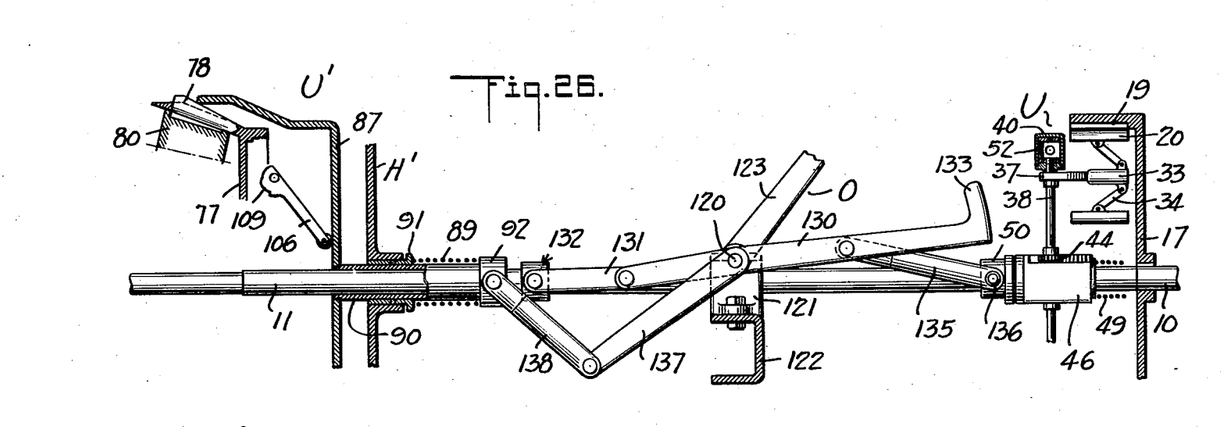

As raising movement of the pedal arm 124 is continued, the meshed relationship of the teeth 20 and 19 is increased as indicated in Figure 25, with a corresponding restriction to the displacement of liquid in the transmission housing H causing less planetary movement of the gears 21 and a consequent decrease in the ratio between the drive shaft 10 and the driven shaft 11, until in the fully meshed position of the teeth as shown in Figure 24, and after gradual closing of by-pass valve 52, all displacement of liquid is prevented so that the shafts rotate as a unit.

It will be manifest that upon depressing the pedal arm from its fully elevated position a reversal of the above described operation will take place, the ratio between the driving and driven shafts being gradually increased until the transmission becomes inactive, following which the clutch C will be engaged and the brake then applied to the driven shaft 11.

An important advantage of the invention is the provision of gearing whereby complete meshing and unmeshing of the co-acting gears can be effected without any bodily movement of the gears which, therefore, can be mounted on fixed axes requiring less space for the gears. The internal sun gears and planetary gears in such fluid displacement mechanism result in a greater leverage on the sun gear with less pressure on the liquid, as well as the advantage of a more compact meshing while providing a larger meshing area of the gears to form a more effective fluid seal and less possibility of lost motion.

A further advantage is the provision of the large valve controlled liquid by-passes 51 in the transmission synchronized to be open except when the gears are fully meshed, thus relieving most of the liquid pressure on the gears in order to facilitate the meshing and unmeshing operations, and providing an additional means of gradual and easily operated fluid control, while in the brake mechanism this same advantage is obtained by the by-passes 85a through the gear structure.

Furthermore, in the braking unit, an important advantage results from the mechanism permitting complete disconnection of the sun gear 77 from the driven shaft 11 so that the gear will remain at rest except when braking of the shaft is being effected, all while enabling the sun gear to be smoothly brought up to the speed of the driven shaft and then locked thereto prior to a braking operation. It will be appreciated that such action is important because of the large resistance set up by the liquid to the rotation of the sun gear which is a great waste of power should the sun gear be permitted to rotate when the brake is released.

Another advantage is provided by the specific form of operating mechanism as operatively connected and synchronized with the units U and U' so as to create maximum power and slow motion at times during the cycle of operation combined with more rapid motion at other times, as is required by the parts being actuated, together with the means of holding one unit stationary after its completion of operation, while operation of the other unit continues to completion.

Figure 28:
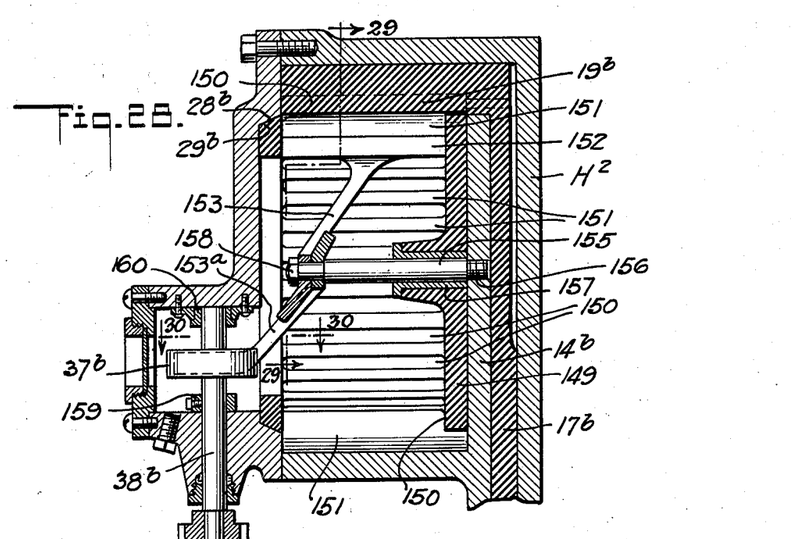
Figure 28 is a fragmentary longitudinal sectional view of another form of fluid displacement mechanism.
Figure 29:
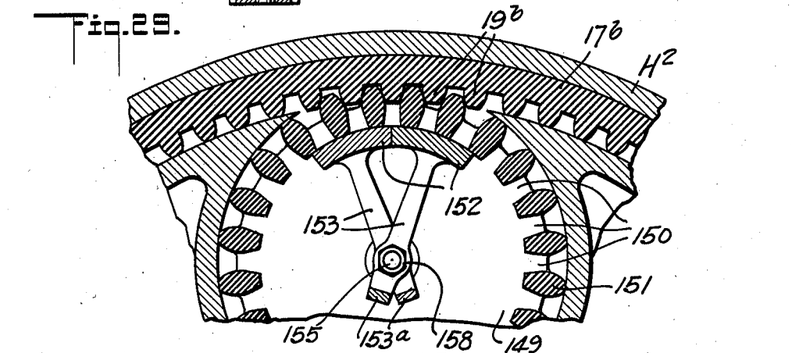
Figure 29 is a fragmentary transverse sectional view taken on the line 29—29 of Figure 28.
Figure 30:
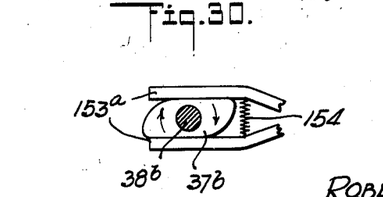
Figure 30 is a fragmentary detail sectional view taken on the line 30—30 of Figure 28.

Reference will now be had to Figures 28, 29 and 30, which illustrate a fluid displacement mechanism employing passages through the tooth area of a gear, for fluid displacement control in use in a transmission, as previously illustrated in the brake mechanism, by which the opening and closing of the passages through the gear gives complete graduated control of fluid displacement for power transmission or brake action.

A planetary gear 149 mounted in a housing H2 has passages 150 through the tooth area of the gear structure between the teeth 151 which form the solid portion of the gear 149 and continually mesh with the teeth 19b of the sun gear 17b. Arcuate slides 152 are carried by arms 153 pivotally mounted on the outer end of the bearing pin 155 and are held in place by a nut 158. These arms are provided with lateral portions 153a urged by a spring 154 into engagement with opposite sides of a cam 37b. The gear 149 rests on bearing 157 mounted on the bearing pin 155 which is in turn solidly screwed into a threaded socket 156 in the housing section 14b and also bears at its forward edge 28b on the bearing surface 29b. The cam shaft 33b is held in position with a collar 159 and collar bearing 160. It is readily seen that motion of the gears will cause the displacement of fluid from the pressure side of the meshing point, down through the passages 150 in the gear 149 between the teeth 151 and back again through the passages on the suction side to its former place between the teeth of the revolving gear. The same action results regardless of which direction the gear rotates. When the arcuate slides 152 are closed together, as illustrated in Figure 29, and the passages 150 on each side of the meshing point of the gears 17b and 149 are closed, no fluid can escape from the pressure side of the gear when in motion. The gears are thus locked together and prevented from turning in relation to each other, causing the driving and driven members of the transmission to turn together as a unit. When the arcuate slides 152 are gradually opened by the cam 37b, increasingly more fluid is allowed to by-pass through the passages 150, resulting in a planetary motion of the gears 149, giving continual changes in power and speed ratio as desired, until when the arcuate slides 152 are opened past the pressure and suction sides of the meshing point, very little resistance to the passage of fluid occurs and no power is transmitted.

It is to be understood that when fluid escapes through by-passes 150 from the pressure side of the meshing point, a relative movement of the meshing gears instantly occurs, which causes a corresponding suction on the opposite side. This is a most vital factor in fluid displacement mechanisms, which prevents the existence of pressure at undesirable points in the mechanisms, pressure existing only between the teeth on the pressure side of the meshing point which may be either side, depending on whether the power exceeds the load or vice versa.

What is claimed is:

1. Fluid displacement mechanism comprising driving and driven elements; means defining a fluid chamber; correlated gears working in said chamber and adapted for operative connection to the driving and driven elements; and means for mounting the teeth of at least one of said gears on the body thereof for movement relative to the body into and out of mesh with the teeth of another gear to vary the displacement of fluid in the chamber for co-action of the gears in accordingly varying the operative connection between the driving and driven elements.

2. Fluid displacement mechanism comprising a driving element; a driven element; a housing defining a fluid chamber and fixed to the driving element for rotation therewith; a sun gear fixed to the driven element and working in said chamber; a planetary gear rotatably mounted in said housing to work in the chamber; means for mounting the teeth of one of said gears for movement relatively thereto into and out of mesh with the teeth of the other gear to vary the displacement of fluid in the chamber, and hence vary the speed ratio between said elements; and means for actuating said movable teeth.

3. Fluid displacement mechanism comprising a driving element; a driven element; a housing defining a fluid chamber and fixed to the driving element for rotation therewith; a sun gear fixed to the driven element and working in said chamber; a planetary gear rotatably mounted in said housing to work in the chamber; means for mounting the teeth of one of said gears for movement relatively thereto into and out of mesh with the teeth of the other gear to vary the displacement of fluid in the chamber, and hence vary the speed ratio between said elements; means for actuating said movable teeth; and means for by-passing fluid through slots in said gear around the zone of mesh of said gears except when the teeth of the gears are in full mesh, to allow movement of said movable teeth and provide, in part, means for fluid by-pass for corresponding partial control of fluid displacement by said gears.

4. Fluid displacement mechanism comprising a driving element; a driven element; a housing defining a fluid chamber and fixed to the driving element for rotation therewith; a sun gear fixed to the driven element and working in said chamber; a planetary gear rotatably mounted in said housing to work in the chamber; means for mounting the teeth of one of said gears for movement relatively thereto into and out of mesh with the teeth of the other gear to vary the displacement of fluid in the chamber, and hence vary the speed ratio between said elements; means for actuating said movable teeth; and valve controlled means co-ordinated with the movements of said teeth by which fluid can by-pass around the zone of mesh of the gears when the teeth thereof are in full mesh.

5. Fluid displacement mechanism comprising a driving element; a driven element; a housing defining a fluid chamber and fixed to the driving element for rotation therewith; a sun gear fixed to the driven element and working in said chamber; a planetary gear rotatably mounted in said housing to work in the chamber; means for mounting the teeth of one of said gears for movement relatively thereto into and out of mesh with the teeth of the other gear to vary the displacement of fluid in the chamber, and hence vary the speed ratio between said elements; means for urging the movable teeth to one extreme position; and means for moving said teeth to and locking them in the other extreme position.

6. Fluid displacement mechanism comprising a drive shaft; a driven shaft; a housing defining a fluid chamber and fixed to the drive shaft for rotation therewith; a sun gear fixed to the driven shaft and working in said chamber; a planetary gear rotatably mounted upon a fixed axis in the housing to work in said chamber; means for mounting the teeth of the planetary gear for movement radially into and out of mesh with the teeth of the sun gear; a camshaft journaled in the housing; a gear fixed to the camshaft; a rack bar meshing with the camshaft gear and mounted on the driven shaft for movement axially thereof to rotate the camshaft in one direction or the other through its gear; a cam on the camshaft; and means for operatively connecting the cam to said movable teeth to effect actuation thereof to one extreme position or another according as the cam is rotated by its shaft in one direction or another.

7. Fluid displacement mechanism comprising a drive shaft; a driven shaft; a housing defining a fluid chamber and fixed to the drive shaft for rotation therewith; a sun gear fixed to the driven shaft and working in said chamber; a planetary gear rotatably mounted upon a fixed axis in the housing to work in said chamber; means for mounting the teeth of the planetary gear for movement radially into and out of mesh with the teeth of the sun gear; a camshaft journaled in the housing; a gear fixed to the camshaft; a rack bar meshing with the camshaft gear and mounted on the driven shaft for movement axially thereof to rotate the camshaft in one direction or the other through its gear; a cam on the camshaft; means for operatively connecting the cam to said movable teeth to effect actuation thereof to one extreme position or another according as the cam is rotated by its shaft in one direction or another; and means for by-passing fluid around the zone of mesh of the sun and planetary gears when in full mesh, including a control valve having a valve element fixed to the camshaft for rotation thereby.

8. Fluid displacement mechanism comprising a drive shaft; a driven shaft; a housing defining a fluid chamber and fixed to the drive shaft for rotation therewith; a sun gear fixed to the driven shaft and working in said chamber; a planetary gear rotatably mounted upon a fixed axis in the housing to work in said chamber and having tooth receiving slots through the periphery thereof; the teeth of the planetary gear being mounted in said slots for adjustment into and out of mesh with the teeth of the sun gear to vary the fluid displacement and hence vary the speed ratio between the driving and driven shafts; means for actuating the movable teeth; and means for rendering fluid in the housing free to by-pass through said slots when the teeth are not in full mesh so as to facilitate movement of the movable teeth by relieving them of fluid pressure.

9. Fluid displacement mechanism comprising means defining a fluid chamber; correlated gears mounted to rotate about axes in said chamber; means for mounting the teeth of at least one of said gears for movement relatively thereto, into and out of mesh with the teeth of the other gear in order to vary the displacement of fluid in said chamber; means defining passages through the gear structure between the teeth of at least one of said gears for fluid by-passes around the meshing point of the gears; and valve means co-ordinated with movements of said movable teeth by which said by-passes can be gradually opened or closed while said gears are in full mesh.

10. In fluid displacement mechanism, means defining a fluid chamber; correlated gears mounted to rotate in said chamber with the teeth of at least one of the gears being mounted on the body thereof for movement relative to the body in variable meshing engagement with the teeth of another gear to vary the displacement of fluid in the chamber; means defining fluid by-passes around the meshing point of the gears; an auxiliary valve controlling said by-passes and co-ordinated in action with said mechanism around the point of fluid displacement control for more gradual control of fluid displacement; and means for operating said valve.

11. In fluid displacement mechanism, means defining a fluid chamber; correlated gears mounted to rotate in said chamber with the teeth of at least one of the gears being mounted on the body thereof for movement relative to the body in variable meshing engagement with the teeth of another gear to vary the displacement of fluid in the chamber; means defining fluid by-passes around the meshing point of the gears; an auxiliary valve controlling said by-passes and co-ordinated in action with said movable teeth to by-pass fluid around the meshing point of said gears after the teeth are in full mesh for gradual control of fluid displacement; and means for operating said valve.

12. Fluid brake mechanism comprising a driven element; a stationary housing defining a fluid chamber and in which the driven element is rotatable; a sun gear freely mounted for rotation about the axis of the driven element to work in said chamber; a second gear mounted for rotation about a fixed axis in said housing to work in said chamber in correlation with the sun gear; means for mounting the teeth of the sun gear for movement relatively thereto, into and out of mesh with the teeth of the second said gear to vary the fluid displacement in the chamber; means for actuating said movable teeth; and means for operatively connecting the sun gear to the driven element so that a braking force will be exerted upon the shaft in accordance with the displacement of fluid in the chamber.

13. Fluid brake mechanism comprising a driven element; a stationary housing defining a fluid chamber and in which the driven element is rotatable; a sun gear freely mounted for rotation about the axis of the driven element to work in said chamber; a second gear mounted for rotation about a fixed axis in said housing to work in said chamber in correlation with the sun gear; means for mounting the teeth of the sun gear for movement relatively thereto, into and out of mesh with the teeth of the second said gear to vary the fluid displacement in the chamber; means for actuating said movable teeth; a friction clutch for operatively connecting the sun gear to and disconnecting it from the driven element according as the sun gear teeth are in mesh or out of mesh with the teeth of the other gear; and means for positively locking the sun gear to the driven element prior to meshing of said teeth.

14. Fluid brake mechanism comprising a driven element; a stationary housing defining a fluid chamber and in which the driven element is rotatable; a sun gear freely mounted for rotation about the axis of the driven element to work in said chamber; a second gear mounted for rotation about a fixed axis in said housing to work in said chamber in correlation with the sun gear; means for mounting the teeth of the sun gear for movement relatively thereto, into and out of mesh with the teeth of the second said gear to vary the fluid displacement in the chamber; means for actuating said movable teeth; a friction clutch having disks alternately keyed to the sun gear and driven element; and means for engaging the clutch to operatively connect the sun gear to the driven element prior to meshing of said teeth.

15. Fluid brake mechanism comprising a driven element; a stationary housing defining a fluid chamber and in which the driven element is rotatable; a sun gear freely mounted for rotation about the axis of the driven element to work in said chamber; a second gear mounted for rotation about a fixed axis in said housing to work in said chamber in correlation with the sun gear; means for mounting the teeth of the sun gear for movement relatively thereto, into and out of mesh with the teeth of the second said gear to vary the fluid displacement in the chamber; means for actuating said movable teeth; a friction clutch having disks alternately keyed to the sun gear and driven element; means for engaging the clutch to operatively connect the sun gear to the driven element prior to meshing of said teeth; a locking member keyed on the driven element and having locking pins adapted for locking engagement with one of said disks to positively lock the sun gear to the driven element; and means for actuating the locking member.

16. Fluid brake mechanism comprising a driven element; a stationary housing defining a fluid chamber and in which the driven element is rotatable; a sun gear freely mounted for rotation about the axis of the driven element to work in said chamber; a second gear mounted for rotation about a fixed axis in said housing to work in said chamber in correlation with the sun gear; means for mounting the teeth of the sun gear for movement relatively thereto, into and out of mesh with the teeth of the second said gear to vary the fluid displacement in the chamber; means for actuating said movable teeth; a friction clutch having disks alternately slidably keyed to the sun gear and driven element; a locking member slidably keyed to the driven element and having locking pins adapted for locking engagement with one of said disks; and means for successively engaging the disks of the clutch and actuating the locking member to first frictionally connect the sun gear to the driven element, and then positively lock the sun gear thereto concurrently with the operation of meshing said teeth.

17. Fluid brake mechanism comprising a driven element; a stationary housing defining a fluid chamber and in which the driven element is rotatable; a sun gear freely mounted for rotation about the axis of the driven element to work in said chamber; a second gear mounted for rotation about a fixed axis in said housing to work in said chamber in correlation with the sun gear; means for mounting the teeth of the sun gear for movement relatively thereto, into and out of mesh with the teeth of the second said gear to vary the fluid displacement in the chamber; a friction clutch having disks alternately slidably keyed to the sun gear and driven element; a locking member slidably keyed to the driven element and having locking pins adapted for locking engagement with one of said disks; means for successively engaging the disks of the clutch and actuating the locking member to first frictionally connect the sun gear to the driven element, and then positively lock the sun gear thereto concurrently with the operation of meshing said teeth; said last means comprising an actuating member for moving the sun gear teeth into and retaining them in mesh; cam carrying arms pivotally mounted on the sun gear for actuation by said actuating member; and locking means comprised in said actuating member for locking the sun gear to the stationary housing when said actuating member is fully advanced and the brake fully applied, to prevent further motion of the gear resulting from leakage of the fluid past the meshing point of the teeth, due to any pressure from the load which may occur.

18. In fluid displacement mechanism, means defining a fluid chamber; correlated gears mounted to rotate in said chamber; means whereby the gears can co-act to vary the displacement of fluid in the chamber; a rotatably mounted camshaft; a gear fixed to the camshaft; a rack bar meshing with the camshaft gear for rotating the camshaft in one direction or the other; a cam on said shaft; and means operatively connecting said cam to the second said means for operation thereof in increasing or decreasing the fluid displacement according as the cam is rotated in one direction or the other.

19. In fluid displacement mechanism, means defining a fluid chamber; correlated gears mounted to rotate in said chamber; means whereby the gears can co-act to vary the displacement of fluid in the chamber; a rotatably mounted camshaft; a gear fixed to the camshaft; a rack bar meshing with the camshaft gear for rotating the camshaft in one direction or the other; a cam on said shaft; means operatively connecting said cam to the second said means for operation thereof in increasing or decreasing the fluid displacement according as the cam is rotated in one direction or the other; and means for by-passing fluid around the gears, including a control valve having a valve element fixed to the camshaft for rotation thereby.

20. Fluid brake mechanism comprising means defining a fluid chamber; correlated gears mounted to rotate in said chamber; means whereby the gears can co-act to vary the displacement of fluid in the chamber; a driven element; a friction clutch for operatively connecting one of said gears to and disconnecting it from the driven element according as the gears co-act to not displace or to displace fluid in the chamber; and means for positively locking said one of the gears to the driven element prior to functioning of said clutch in operatively connecting one gear to the driven element as aforestated.

21. Fluid brake mechanism comprising means defining a fluid chamber; correlated gears mounted to rotate in said chamber; means whereby the gears can co-act to vary the displacement of fluid in the chamber; a driven element; a friction clutch having disks alternately keyed to one of said gears and driven element; means for actuating said clutch to operatively connect said one of the gears to the driven element prior to co-action of said gears in displacing fluid; a locking member slidably keyed on the driven element and having locking pins adapted for locking engagement with one of said disks to positively lock said one of the gears to the driven element; and means for actuating the locking member.

22. Fluid displacement mechanism having coaxially related and relatively rotatable parts; and means for rigidly locking said parts of the mechanism in any relative position, including two locking members, one of which is provided with a circular series of holes variably spaced circumferentially of the member, and the other of which members is provided with a circular series of flared holes equally spaced circumferentially and adapted to co-act with the first mentioned holes; locking pins having a beveled portion co-actable with said flared holes and slidably mounted in the holes of the first said member; springs urging the pins to a projected position for reception of one or more of the pins in such holes of the second said member as are alined with the pins; said holes of the first said member being so spaced that at least one pin will always be in alinement or so nearly alined with one of the holes in the second member, as to insure locking of the latter to the first said member.

23. Fluid brake mechanism comprising a driven element; a stationary housing defining a fluid chamber and in which the driven element is rotatable; a sun gear freely mounted for rotation about the axis of the driven element to work in said chamber; said sun gear having tooth receiving slots with adjoining passages for by-pass of fluid; a second gear mounted for rotation about a fixed axis in said housing to work in said chamber in correlation with the sun gear; means for mounting the teeth of the sun gear in said slots for radial movement into and out of mesh with the teeth of said second gear to vary the fluid displacement in said chamber; means for actuating the sun gear teeth; means for operatively connecting the sun gear to the driven element so that a braking force will be applied to the latter in accordance with the fluid displacement; and means for rendering fluid in the housing free to by-pass through said adjoining passages during the meshing and unmeshing operations so as to facilitate actuation of the movable teeth by relieving them of fluid pressure.

ROBERT MELVILLE.